(12) United States Patent
Myung et al.

(10) Patent No.: US 12,602,584 B2
(45) Date of Patent: Apr. 14, 2026

(54) METHOD AND APPARATUS FOR LEARNING EQUIVARIANT AND INVARIANT REPRESENTATION FOR ROTATION OF IMAGE BASED ON GRAPH CONVOLUTIONAL NETWORK

(71) Applicant: Korea Advanced Institute of Science and Technology, Daejeon (KR)

(72) Inventors: Hyun Myung, Daejeon (KR); Sungwon Hwang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 585 days.

(21) Appl. No.: 17/973,408

(22) Filed: Oct. 25, 2022

(65) Prior Publication Data

US 2023/0368016 A1 Nov. 16, 2023

(30) Foreign Application Priority Data

May 10, 2022 (KR) ........................ 10-2022-0057319

(51) Int. Cl.
 *G06N 3/08* (2023.01)
 *G06V 10/82* (2022.01)
(52) U.S. Cl.
 CPC .............. *G06N 3/08* (2013.01); *G06V 10/82* (2022.01)
(58) Field of Classification Search
 CPC ........ G06N 3/08; G06N 3/0464; G06N 3/084; G06V 10/82; G06T 3/60; G06T 2207/20084
 See application file for complete search history.

(56) References Cited

U.S. PATENT DOCUMENTS

2021/0334531 A1* 10/2021 Zhang ................... G06N 20/10
2022/0383035 A1* 12/2022 Saad .................... G06F 16/538
2023/0245419 A1* 8/2023 Li ....................... G06V 10/426
 382/190
2024/0419382 A1* 12/2024 Dekel ................... G06V 20/70

OTHER PUBLICATIONS

Yang Q, Li C, Dai W, Zou J, Qi GJ, Xiong H. Rotation equivariant graph convolutional network for spherical image classification. InProceedings of the IEEE/CVF conference on computer vision and pattern recognition 2020 (pp. 4303-4312). (Year: 2020).*

(Continued)

*Primary Examiner* — Fayyaz Alam
(74) *Attorney, Agent, or Firm* — CHRISTENSEN O'CONNOR JOHNSON KINDNESS PLLC

(57) ABSTRACT

Disclosed are a method and apparatus for learning equivariant and invariant representations for rotation of an image based on a graph convolutional network. The method of learning an equivariant and invariant representation for rotation of an image based on a graph convolutional network performed by a computer device includes learning an equivariant representation for rotation of an image by using a self-weighted nearest neighbors graph convolutional network (SWN-GCN); and finally obtaining the equivariant representation for the rotation of the image obtained from the self-weighted nearest neighbors graph convolutional network as an invariant representation of the rotation of the image by using permutation invariance of global average pooling (GAP).

14 Claims, 6 Drawing Sheets

Train: $f(g(X))$

Inference: $f(g(\Psi(X)))$

CNN            SWN-GCN (proposed)

(56)  References Cited

OTHER PUBLICATIONS

Poulenard A, Guibas LJ. A functional approach to rotation equivari-
ant non-linearities for Tensor Field Networks. InProceedings of the
IEEE/CVF Conference on Computer Vision and Pattern Recogni-
tion 2021 (pp. 13174-13183). (Year: 2021).*
Sharma M, Biswas M. Classification of hyperspectral remote sens-
ing image via rotation-invariant local binary pattern-based weighted
generalized closest neighbor. The Journal of Supercomputing. Jun.
2021;77:5528-61. (Year: 2021).*
Renata Khasanova and Pascal Frossard, "Graph-based isometry
invariant representation learning", In Proceedings of the Interna-
tional Conference on Machine Learning, pp. 1847-1856, 2017.
Hugo Larochelle et al., "An empirical evaluation of deep architec-
tures on problems with many factors of variation", In Proceedings
of the International Conference on Machine Learning, pp. 473-480,
2007.
Laurens van der Maaten et al., "Visualizing data using t-sne",
Journal of Machine Learning Research, Nov. 9:2579-2605, 2008.
Thomas N Kipf et al., "Semi-supervised classification with graph
convolutional networks", arXiv preprint arXiv:1609.02907, 2016.

* cited by examiner

*Train:* $f(g(X))$

*Inference:* $f(g(\Psi(X)))$

CNN                    SWN-GCN *(proposed)*

<u>400</u>

METHOD AND APPARATUS FOR LEARNING EQUIVARIANT AND INVARIANT REPRESENTATION FOR ROTATION OF IMAGE BASED ON GRAPH CONVOLUTIONAL NETWORK

CROSS-REFERENCE TO RELATED APPLICATIONS

A claim for priority under 35 U.S.C. § 119 is made to Korean Patent Application No. 10-2022-0057319 filed on May 10, 2022, in the Korean Intellectual Property Office, the entire contents of which are hereby incorporated by reference.

BACKGROUND

Embodiments of the inventive concept described herein relate to an artificial intelligence network that extracts equivariant and invariant representations in rotation of an image, and more particularly, relate to a method and apparatus for learning equivariant and invariant representations for rotation of an image based on a graph convolutional network.

In the past few years, especially in many computer vision tasks, convolutional neural networks (CNNs) have been greatly developed. High performance is achieved by utilizing a phenomenal technique of making a learned convolutional filter and to a layer deeper. These advances have resulted in performance close to humans in image classification tasks in various datasets. In particular, it has been empirically shown that the deeper layer of CNN-learns much more translation invariant features at each layer taking into account the wide applicability and reliability of CNN.

However, the achievement of rotational invariance is another desirable property of a network, specifically in an application that requires inference on an arbitrarily rotated image such as aerial or biomedical microscopy image. To this end, the most common scheme of training a neural network to produce a rotation invariant representation is data augmentation. The network, which provides rotational augmented images for training, may learn representations represented by different rotations. When related to an exact objective function, the network may reasonably produce an invariant representation or inference regardless of the rotation of an input.

However, the model trained with data augmentation does not capture local equivariance and may entail black box problems. In addition, due to the extensive data augmentation list for training transformation robust networks, the dataset size is enlarged with an exponential increase in the search space for augmentation. Thus, when freed from rotational augmentation during training, it is possible to reduce a significant number of trainings and provide more search space for other-types of data augmentation. Considering that rotation is one of the most common types of data augmentation, achieving rotational invariance in a network is a big part in reducing dependence on data growth.

In order to solve this problem, as the most recent attempt, the above-mentioned problem had been explicitly defined and the solution had been proposed in following non-patent document 1. The researchers trained the network only on vertical 2D images without transformation augmentation and evaluated the network with images augmented with isometry transformations, to verify the transformation invariance of the proposed network.

DOCUMENT OF RELATED ART

Non-Patent Document (Non-patent document 1) Renata Khasanova and Pascal Frossard Graph-based isometry invariant representation learning. In Proceedings of the International Conference on Machine Learning, pages 1847-1856, 2017.

(Non-patent document 2) Hugo Larochelle, Dumitru Erhan, Aaron Courville, James Bergstra, and Yoshua Bengio. An empirical evaluation of deep architectures on problems with many factors of variation. In Proceedings of the International Conference on Machine Learning, pages 473-480, 2007.

(Non-patent document 3) Laurens van der Maaten and Geoffrey Hinton. Visualizing data using t-sne. Journal of Machine Learning Research, 9(November):2579-2605, 2008.

(Non-patent document 4) Thomas N Kipf and Max Welling. Semi-supervised classification with graph convolutional networks. arXiv preprint-arXiv:1609.02907, 2016.

SUMMARY

Embodiments of the inventive concept provide a method and apparatus for learning an equivariant and invariant representation for rotation of an image based on a graph convolutional network. Specifically, embodiments of the inventive concept provide techniques for constructing a deeper image representation network by extending the field of view further than a spectral graph convolution-based method and using an equivariant bridge SO(2) invariant graph convolution network.

Embodiments of the inventive concept provide a method and apparatus for learning an equivariant and invariant representation for rotation of an image based on a graph convolutional network, which are capable of acquiring a constant representation of the rotation of an image without data, augmentation by acquiring the rotation equivariant and invariant representation of the image by using the structural characteristics of the graph convolutional network.

According to an exemplary embodiment, a method of learning an equivariant and invariant representation for rotation of an image based on a graph convolutional network performed by a computer device includes learning the equivariant representation for the rotation of the image by using a self-weighted nearest neighbors graph convolutional network (SWN-GCN); and finally obtaining the equivariant representation for the rotation of the image obtained from the self-weighted nearest neighbors graph convolutional network as the invariant representation of the rotation of the image by using permutation invariance of global average pooling (GAP).

The self-weighted nearest neighbors graph convolutional network (SWN-GCN) may learn the equivariant representation of the rotation of the image based on a scheme of applying a graph convolutional network to the graphed image.

The learning of the equivariant representation may include representing an image as a graph having a vertex by using the self-weighted nearest neighbors graph convolutional network (SWN-GCN); obtaining an adjacency matrix representing adjacency between two vertices; and constructing a unit layer of an equivariant network by using unit propagation of the self-weighted nearest neighbors graph convolutional network (SWN-GCN) when a propagation set of the vertex is given.

The unit propagation of the self-weighted nearest neighbors graph convolutional network (SWN-GCN) may include a self-weighted message passing network (SMP) and a shared-weight graph propagation network (SGP).

The final obtaining of the equivariant representation may include representing a set of equivariant vertices for rotation of the image in an invariant representation by using the global average pooling (GAP).

The final obtaining of the equivariant representation may include performing final classification with a fully connected layer non-linearized with ReLU.

The equivariant and invariant representation for, the rotation of the image may be obtained by utilizing a structural feature of the self-weighted nearest neighbors graph convolutional network (SWN-GCN) without data augmentation.

According to another exemplary embodiment, an apparatus for learning an equivariant and invariant representation for rotation of an image based on a graph convolutional network includes a rotation equipvarient representation unit configured to learn the equivariant representation for the rotation of the image by using a self-weighted nearest neighbors graph convolutional network (SWN-GCN); and a rotation invariant representation unit configured to finally obtain the equivariant representation for the rotation of the image obtained from the self-weighted nearest neighbors graph convolutional network as the invariant representation of the rotation of the image by using permutation invariance of global average pooling (GAP).

The self-weighted nearest neighbors graph convolutional network (SWN-GCN) may learn the equivariant representation of the rotation of the image based on a scheme of applying a graph convolutional network to the graphed image.

The rotation equipvarient representation unit may represent an image as a graph having a vertex by using the self-weighted nearest neighbors graph convolutional network (SWN-GCN), obtain an adjacency matrix representing adjacency between two vertices, and construct a unit layer of an equivariant network by using unit propagation of the self-weighted nearest neighbors graph convolutional network (SWN-GCN) when a propagation set of the vertex is given.

The unit propagation of the self-weighted nearest neighbors graph convolutional network (SWN-GCN) may include a self-weighted message passing network (SMP) and a shared-weight graph propagation network (SGP).

The rotation invariant representation unit may represent a set of equivariant vertices for the rotation of the image in an invariant representation by using the global average pooling (GAP).

The rotation invariant representation unit may perform final classification with a fully connected layer non-linearized with ReLU.

The equivariant and invariant representation for the rotation of the image may be obtained by utilizing a structural feature of the self-weighted nearest neighbors graph convolutional network (SWN-GCN) without data augmentation.

According to still another exemplary embodiment, a method of learning an equivariant and invariant representation for rotation of an image based on a graph convolutional network performed by a computer device includes learning the equivariant representation for the rotation of the image by using a self-weighted nearest neighbors graph convolutional network (SWN-GCN).

The self-weighted nearest neighbors graph convolutional network (SWN-GCN) may learn the equivariant representation of the rotation of the image based on a scheme of applying a graph convolutional network to the graphed image.

The learning of the equivariant representation may include representing an image as a graph having a vertex by using the self-weighted nearest neighbors graph convolutional network (SWN-GCN); obtaining an adjacency matrix representing adjacency between two vertices; and constructing a unit layer of an equivariant network by using unit propagation of the self-weighted nearest neighbors graph convolutional network (SWN-GCN) when a propagation set of the vertex is given.

The unit propagation of the self-weighted nearest neighbors graph convolutional network (SWN-GCN) may include a self-weighted message passing network (SMP) and a shared-weight graph propagation network (SGP).

The method may further include finally obtaining the equivariant representation for the rotation of the image obtained from the self-weighted nearest neighbors graph convolutional network as the invariant representation of the rotation of the image by using permutation invariance of global average pooling (GAP).

The equivariant and invariant representation for the rotation of the image may be obtained by utilizing a structural feature of the self-weighted nearest neighbors graph convolutional network (SWN-GCN) without data augmentation.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1A:
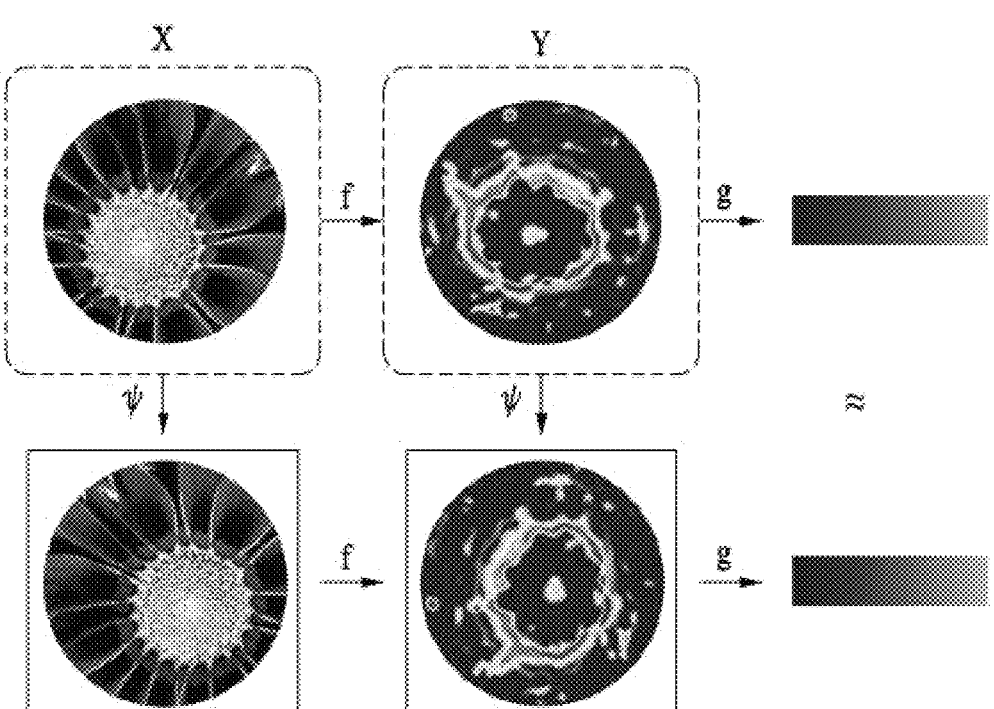
FIG. 1A is a view illustrating an equivariant function according to an embodiment.

Hereinafter, preferable embodiments of the inventive concept will be described in detail with reference to accompanying drawings. However, the spirit and technical scope of the inventive concept is not limited to the embodiments and may be modified variously in many different forms. In addition, the embodiments are given to provide complete disclosure of the inventive concept and to provide thorough understanding of the inventive concept to those skilled in the art. In addition, the shapes and the sizes of the components shown in the drawings may be exaggerated for clarity of explanation.

In general, a data augmentation scheme is used to train a convolutional neural network (CNN) to be equivariant and invariant to the rotation of an image. However, in the present embodiment, the dependence on data augmentation is reduced by achieving structural rotation equivariance and invariance of a neural network, and at the same time, to this end, a progressive research direction is presented.

The embodiment proposes a neural network with structural rotation equivariance and invariance, which is largely composed of two parts. First, we propose a self-weighted nearest neighbors graph convolutional network (SWN-GCN) to learn rotation equivariant deep representations, which is based on a scheme of applying a graph convolutional network to a graphed image. In addition, the rationale for deep learning of the graph convolutional network compared to an existing spectral graph-based neural network will be also covered. Second, by using the permutation invariance of global average pooling (GAP), the rotation equivariant representation obtained from the graph convolutional network is finally obtained as a rotation invariant representation. In addition, the rationale for GAP in favor of representation of deep invariance will be covered.

A rotation invariant classification experiment is performed on MNIST and CIFAR-10 datasets. In the experiment, after learning networks without data augmentation for rotation, classification performance is derived with a data set for performance evaluation including data augmentation for rotation. As a result, the network presented in the embodiment derives performance superior to that of existing methodologies. In addition, in the embodiment, qualitative and quantitative evaluation of rotational equivalence and rotational invariance of the presented network representation is also performed.

The following embodiments propose an artificial intelligence network that can obtain a representation that is invariant to rotation of an image without using data augmentation. Therefore, while maintaining the amount of learning data, it is possible to learn artificial intelligence robustly in rotation.

In addition, embodiments may solve the gradient explosion problem by extracting representations that are equivariant and invariant to rotation based on a graph convolutional network. Accordingly, because the graph network according to the embodiments can be formed very deeply without limiting the depth, it is much more advantageous to the existing technology in expressing complex data.

Instead of obtaining several filters representing different rotations, a tunable filter may be constructed as a finite linear combination of non-simplified representations to achieve transformation invariance. A recent study extends the concept to a controllable CNN by obtaining isoform of transformation built as a basic representation from a transformation equivariant filter bank. Subsequent tasks include parameterization of steerable filters, restricting the type of the filter from a series of circular harmonics to achieve hard-baking rotation equivariance, or applying convolutional filters in multiple directions to retrieve a vector field representation of a deep feature.

Most recently, E(2)-CNN makes an overall implementation of the aforementioned transformation equivariance network in a controllable filter. Based on group theory, the implementation achieves E(2) (transformation, rotation, reflection in Euclidean space) equivariance and achieves state-of-the-art performance through the MNIST rot (non-patent document 2) dataset classification task.

The promising potential of a deep learning graph-based network for graphs has been demonstrated by a low-dimensional graph domain in the generalization of CNNs with the extension of convolution through Laplacian spectra. Thereafter, the spectral network with graph estimation procedure made the graph-based network deeper and demonstrated better performance than the large-scale classification problem.

Meanwhile, a graph convolutional network (GCN) is-one of the most common graph processing networks, and is designed as a normalized first-order approximation of spectral graph convolution to perform quasi-supervised learning on graph structured data. The GCN has been effectively applied in a wide range of fields such as multi-label image recognition, temporal-action localization, and even solid materials science.

Ti-Pooling realizes rotation invariant representation by supplying several rotation instances of an image to the Siamese twin network and then by performing element-wise pooling. Meanwhile, a spatial transformer network (STN) serves to generate a transformation invariant representation by learning an affine transform in highly distorted data. Meanwhile, a graph-based isometry-invariant network has been proposed as a successful attempt to express an isometry-invariant image using a graph. Such methodology uses spectral convolution and dynamic pooling to retrieve an isometry equivariant graph representation of an image, and uses a statistical layer for a Chebyshev polynomial representation of a graph signal to search for an isometry invariant representation.

In the following, the problem is first defined.

Equivariance and Invariance

Given function f: X→Y, the 'f' is said to be equivariant to a transformation group when all transformations $\psi \in \Psi$ of the input $\mathcal{X} \in$ X may be associated with the same transformation of the corresponding expression $\mathcal{Y} \in$ Y, and expressed as follows.

$$f(\psi(\mathcal{X})) = \psi(f(\mathcal{X})) = \psi(\mathcal{Y}) \qquad \text{[Equation 1]}$$

Meanwhile, given a function g: Y→Z, when $\psi$ of the space Y yields the identity transformation of Z, g may be said to be invariant with respect to the transformation $\psi$, and may be expressed as follows.

$$g(\psi(\mathcal{Y})) = g(\mathcal{Y}) \qquad \text{[Equation 2]}$$

Then, the configuration of the equivariant function f and the invariant function g may yield an invariant function for $\psi$, and may be expressed as follows.

$$g(f(\psi(\mathcal{X}))) = g(\psi(f(\mathcal{X}))) = g(f(\mathcal{X})) \qquad \text{[Equation 3]}$$

As a unit of effectively projecting the input into a high-dimensional representation space instead of directly transforming the input image into an invariant representation, the equivariant network is bridged as shown in FIG. 1A. FIG. 1A is a view illustrating an equivariant function according to an embodiment.

Reexamination of Equivariant Network Value.

Most methodologies of equivariant networks train and test a network through rotation augmented datasets such as MNIST-rot (non-patent document 2) to verify performance. The significance of this task is that the equivariant network has a greater capacity to learn all different representations of a rotation augmentation input. This is because representations are less variable and it is easy to apply consistency.

However, the goal of this embodiment is to build a structurally invariant network that can make invariant inferences about rotation without increasing rotation. As described in the equivariance bridge SO(2) invariance network below, obtaining high-dimensional and equivariant feature spaces with respect to a transformation invariance function is a key step towards achieving the goal.

Equivariance Bridge SO(2) Invariance Network

By designating X as the training dataset and the target function L, the goal of the present embodiment is to find the optimal parameters $$w_f^* = \mathrm{argmin}_{w_f} \mathcal{L}(g(f(X; w_f)))$$ [Equation 4]

of the rotation equivariance network $f(\bullet; w_f)$, the rotation invariance function $g(\bullet)$ and the network f that satisfy the following.

[Equation 4]

$$w_f^* = \mathrm{argmin}_{w_f} \mathcal{L}\ (g(f(X; w_f))).$$ (4)

Then, given the rotation angle $\theta \in [0°, 360°)$, the corresponding rotation transformation $R^\theta \in R$ (where R is a rotation transformation group for the image representation and forms equivariance with SO(2)), and the corresponding rotation image $\mathcal{R}^\theta = R^\theta(X)$, the target network and parameters of the embodiment must satisfy [Equation 3] and may be expressed as follows.

$$g(f(R^\theta; w_f^*)) = g(f(X; w_f^*))$$ [Equation 5]

Figure 1B:
FIG. 1B is a view illustrating a comparison of the visualized t-SNE feature expressions of the random rotation MNIST extracted by CNN and a method according to an embodiment
Figure 1B:
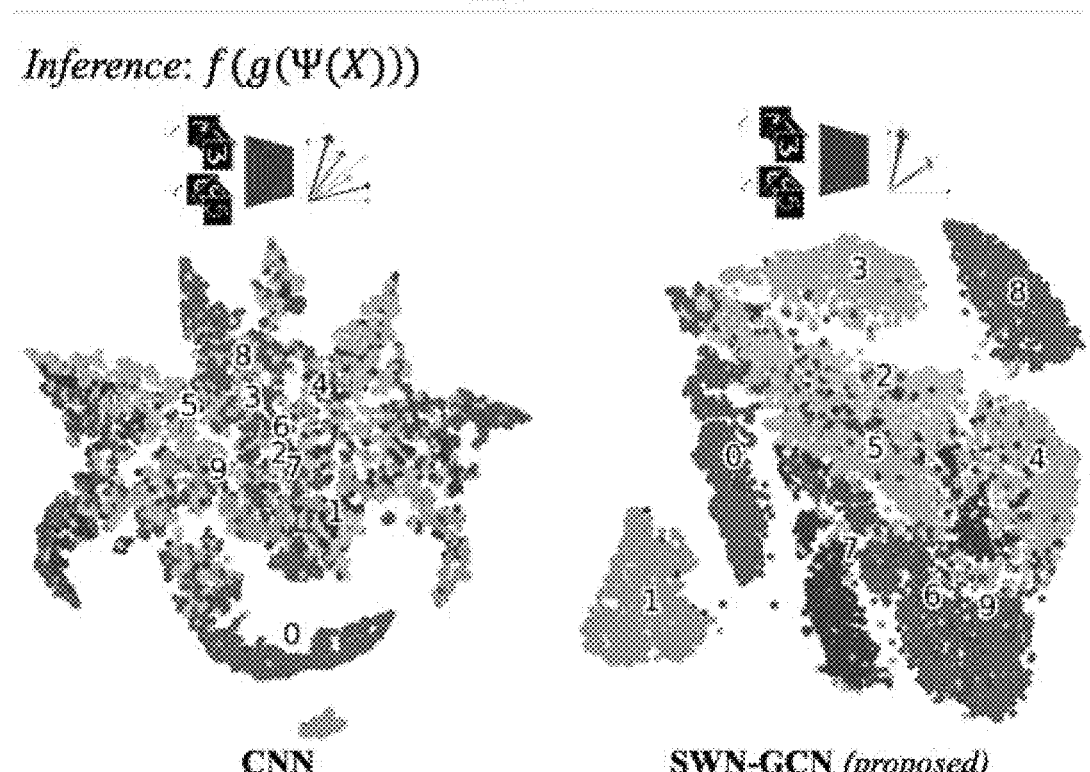

Therefore, $$g(f(\cdot; w_f^*))$$

trained on the vertical dataset X must produce an invariant representation for all $R^\theta$. The visualized t-SNE (non-patent document 3) representation of the randomly rotated input image extracted by the method according to the embodiments compared to that extracted from ResNet-50 may be used in FIG. 1B. FIG. 1B is a view illustrating a comparison of the visualized t-SNE feature expressions of the random rotation MNIST extracted by CNN and the method according to an embodiment.

Figure 2:
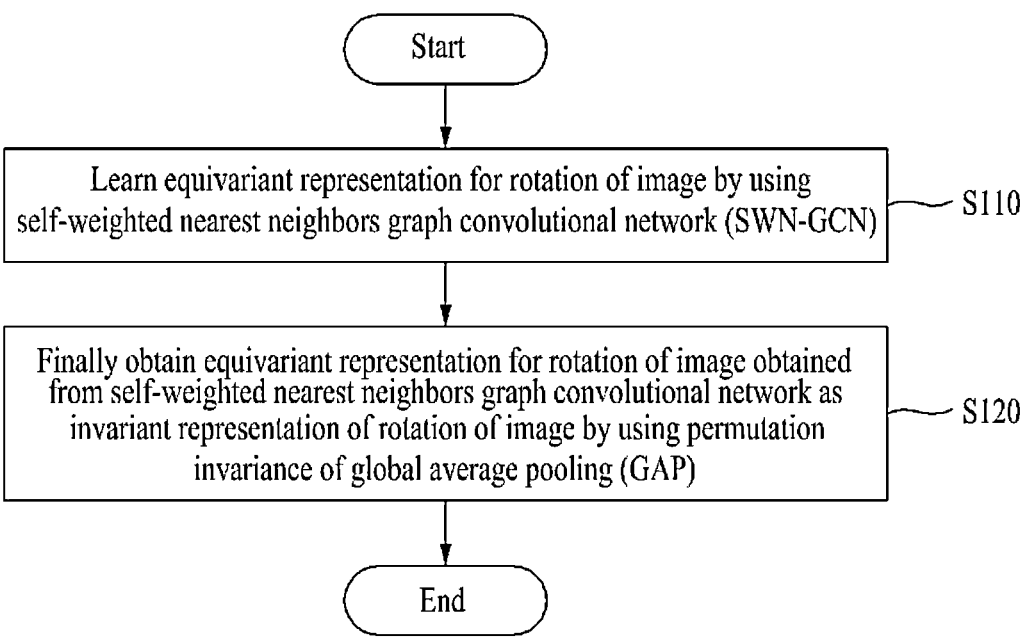
FIG. 2 is a flowchart illustrating an equivariant and invariant representation learning method for rotation of an image based on a graph convolutional network according to an embodiment.
Figure 3:
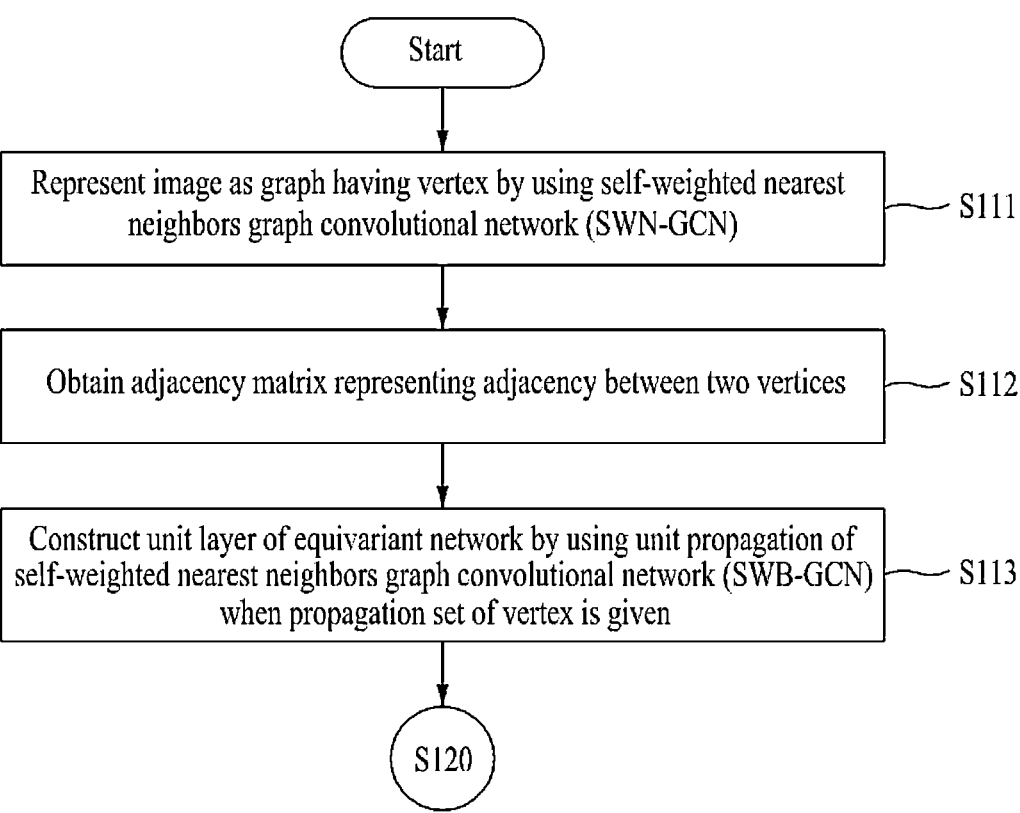
FIG. 3 is a flowchart illustrating a method of learning an equivariant representation for rotation of an image according to an embodiment.

FIG. 2 is a flowchart illustrating an equivariant and invariant representation learning method for rotation of an image based on a graph convolutional network according to an embodiment. FIG. 3 is a flowchart illustrating a method of learning an equivariant representation for rotation of an image according to an embodiment.

Referring to FIG. 2, a method of learning an equivariant and invariant representation for rotation of an image based on a graph convolutional network performed by a computer device according to an embodiment may include operation S110 of learning an equivariant representation for rotation of an image by using a self-weighted nearest neighbors graph convolutional network (SWN-GCN), and operation S120 of finally obtaining the equivariant representation for the rotation of the image obtained from the self-weighted nearest neighbors graph convolutional network as an invariant representation of the rotation of the image by using permutation invariance of global average pooling (GAP).

Referring to FIG. 3, the operation of learning the equivariant representation may include operation S111 of representing an image as a graph having a vertex by using the self-weighted nearest neighbors graph convolutional network (SWN-GCN), operation S112 of obtaining an adjacency matrix representing adjacency between two vertices, and operation S113 of constructing a unit layer of an equivariant network by using unit propagation of the self-weighted nearest neighbors graph convolutional network (SWN-GCN) when a propagation set of the vertex is given.

Hereinafter, the method of learning equivariant and invariant representations for rotation of an image based on a graph convolutional network according to an embodiment will be described in more detail.

The method of learning equivariant and invariant representations for rotation of an image based on a graph convolutional network according to an embodiment will be described with an apparatus for learning an equivariant and invariant representation for rotation of an image based on a graph convolutional network according to an embodiment as an example.

Figure 4:
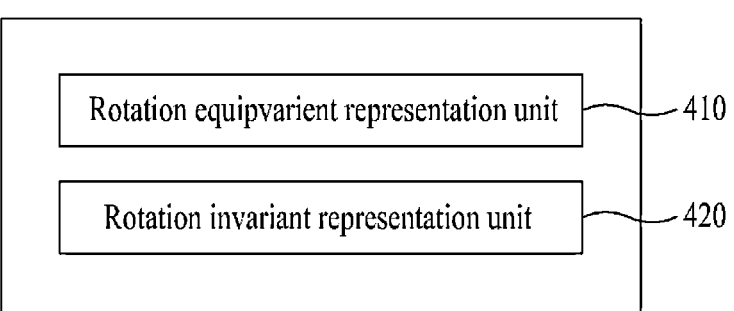
FIG. 4 is a block diagram illustrating an apparatus for learning an equivariant and, invariant representation for rotation of an image based on a graph convolutional network according to an embodiment.

FIG. 4 is a block diagram illustrating an apparatus for learning an equivariant and invariant representation for rotation of an image based on a graph convolutional network according to an embodiment.

Referring to FIG. 4, an apparatus 400 for learning an equivariant and invariant representation for rotation of an image based on a graph convolutional network according to an embodiment may include a rotation equipvarient representation unit 410 and a rotation invariant representation unit 420.

The rotation equipvarient representation unit 410 may learn an equivariant representation for rotation of an image by using a self-weighted nearest neighbors graph convolutional network (SWN-GCN). In this case, the self-weighted nearest neighbors graph convolutional network (SWN-GCN) may learn the equivariant representation of the rotation of the image based on a scheme of applying a graph convolutional network to a graphed image The rotation equipvarient representation unit 410 may represent an image as a graph having a vertex by using the self-weighted nearest neighbors graph convolutional network (SWN-GCN), obtain an adjacency matrix representing adjacency between two vertices, and construct a unit layer of an equivariant network by using unit propagation of the self-weighted nearest neighbors graph convolutional network (SWN-GCN) when a propagation set of the vertex is given. In this case, the unit propagation of the self-weighted nearest neighbors graph convolutional network (SWN-GCN) may include two networks and may include a self-weighted message passing network (SMP) and a shared-weight graph propagation network (SGP).

The rotation invariant representation unit 420 may finally obtain the equivariant representation for the rotation of the image obtained from the self-weighted nearest neighbors graph convolutional network as an invariant representation of the rotation of the image by using permutation invariance of global average pooling (GAP).

The rotation invariant representation unit 420 may represent a set of equivariant vertices for rotation of the image in an invariant representation by using global average pooling (GAP). In addition, the rotation invariant representation unit 420 may perform final classification with a fully connected layer non-linearized with ReLU.

Accordingly, it is possible to obtain the equivariant and invariant representation for the rotation of the image by utilizing a structural feature of the self-weighted nearest neighbors graph convolutional network (SWN-GCN) without data augmentation.

According to another embodiment, a method of learning an equivariant representation for rotation of an image based on a graph convolutional network performed by a computer device may include an operation of learning an equivariant representation for rotation of an image by using a self-weighted nearest neighbors graph convolutional network (SWN-GCN).

In this case, the operation of learning the equivariant representation may include an operation of representing an image as a graph having a vertex by using the self-weighted nearest neighbors graph convolutional network (SWN-GCN), an operation of obtaining an adjacency matrix representing adjacency between two vertices, and constructing a unit layer of an equivariant network by using unit propagation of the self-weighted nearest neighbors graph convolutional network (SWN-GCN) when a propagation set of the vertex is given.

In addition, the method may further include an operation of finally obtaining the equivariant representation for the rotation of the image obtained from the self-weighted nearest neighbors graph convolutional network as an invariant representation of the rotation of the image by using permutation invariance of global average pooling (GAP).

Meanwhile, the method of learning an equivariant representation for rotation of an image based on a graph convolutional network performed by a computer device according to another embodiment may include the configurations of the learning an equivariant representation for rotation of an image based on a graph convolutional network performed by a computer device according to an embodiment, and the duplicate description will be omitted. The method of learning an equivariant representation for rotation of an image based on a graph convolutional network performed by a computer device according to another embodiment may be performed by the apparatus for learning an equivariant representation for rotation of an image based on a graph convolutional network described above.

Figure 5:
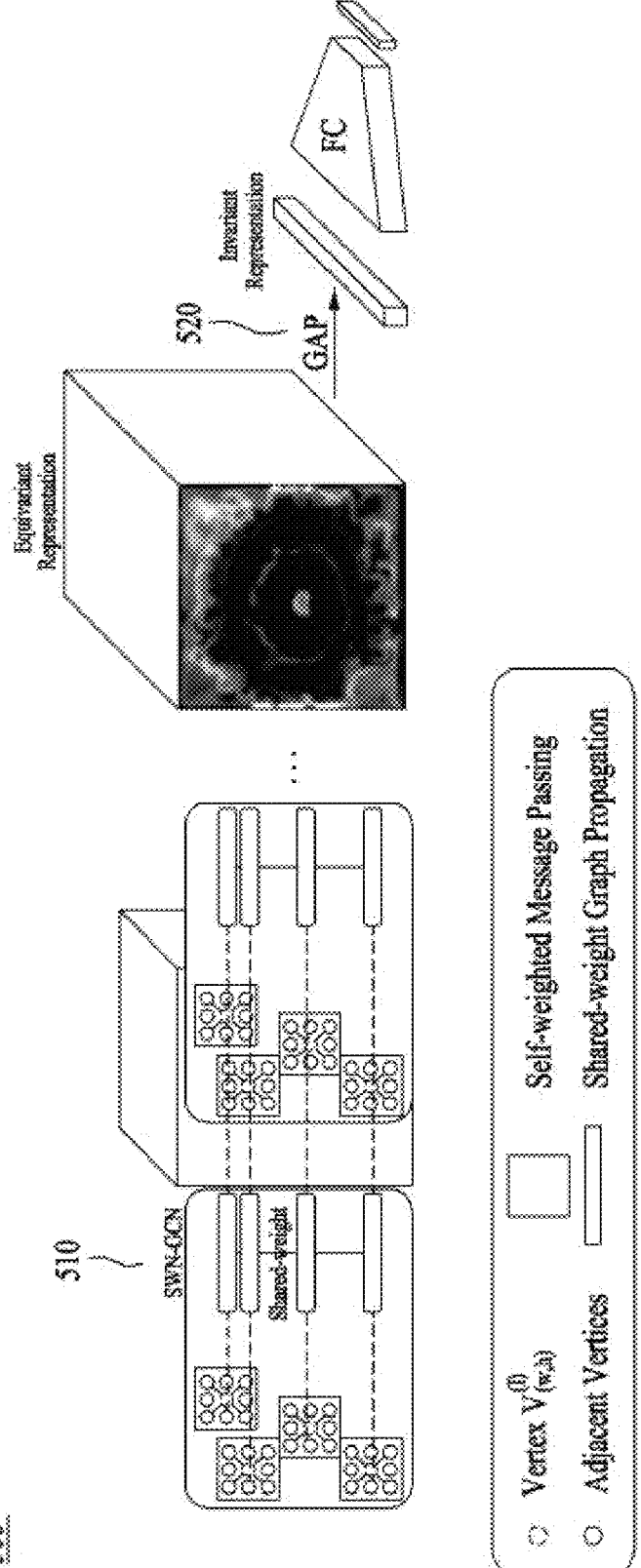
FIG. 5 is a diagram schematically illustrating a self-weighted nearest neighbor graph convolutional network (SWN-GCN) according to an embodiment.

FIG. 5 is a diagram schematically illustrating a self-weighted nearest neighbor graph convolutional network (SWN-GCN) according to an embodiment.

Referring to FIG. 5, an outline of the network proposed in the embodiment is shown. A self-weighted nearest neighbors graph convolutional network (SWN-GCN) is proposed to learn graph-based features in high-dimensional and rotational equivariant representation spaces, followed by global average pooling (GAP) for invariant mapping of equivariant representations.

SWN-GCN Propagation Rule

The GCN (non-patent document 4) is applied to an instance of an image X of width W and height H represented by an undirected graph representation $\mathcal{G} =(\mathcal{V},A)$. The 'V' is the set of vertices of the number $|\mathcal{V}|=W{\cdot}H$, and $A\in R^{|\mathcal{V}|\times|\mathcal{V}|}$ is the adjacency matrix between the vertices. In detail, according to an embodiment, it starts by representing X as a graph having a following vertex.

$$\mathcal{V}^{(0)} = \left[\mathcal{V}^{(0)}_{(1,1)}, \mathcal{V}^{(0)}_{(w,h)}, \ldots , \mathcal{V}^{(0)}_{(W,\mathcal{H})}\right]^{T} \in R^{|\mathcal{V}|\times c^{(0)}} \qquad \text{[Equation 6]}$$

Where $$\mathcal{V}^{(0)}_{(w,h)}$$

denotes a value for each channel located at (w, h) in the image X, and $c^{(0)}$ is the input channel size of 'X'. That is, $c^{(0)}=1$ for grayscale images and $c^{(0)}=3$ for color images.

The components of the adjacency matrix A indicating the adjacency between two vertices $$\mathcal{V}^{(0)}_{(w,h)} \text{ and } \mathcal{V}^{(0)}_{(w',h')}$$

are represented by $A_{[(w,h),(w',h')]}$, and are defined as follows.

$$A\{[(w, h), (w', h')]\} = 1 \quad \text{if } 0 < d^{[(w',h')]}_{[(w,h)]} \leq \sqrt{2} \qquad \text{[Equation 7]}$$

$$0, \qquad\qquad\qquad \text{otherwise}$$

$$\text{Where } d^{[(w',h')]}_{[(w,h)]} = \backslash sqrt\left\{(w - w')^2 + (h - h')^2\right\}$$

Then, given the first propagation set of vertex $V^{(l)}$, the unit propagation of SVN-GCN includes two networks. These networks are called a self-weighted message passing neural network (SGP, $\xi(\bullet)$) and a shared-weighted graph propagation neural network (SGP, $\xi(\bullet)$). By using these networks, the unit layer of the corresponding equivariant network $f^{(l)}: \mathcal{V}^{(\ell)} \to \mathcal{V}^{(\ell+1)}$ is configured as follows.

$$\hat{\mathcal{V}^{(l)}} = D^{-\frac{1}{2}}\overline{A^{(l)}}\overline{D}^{-\frac{1}{2}}\mathcal{V}^{(l)} := \zeta^{(l)}\left(\mathcal{V}^{(l)}, A\right) \qquad \text{[Equation 8]}$$

$$\mathcal{V}^{(\ell+1)} = \kappa^{(l)}_2\left(\kappa^{(l)}_1(\hat{\mathcal{V}^{(l)}})\right) := \xi^{(l)}(\widehat{\mathcal{V}^{(l)}}) \qquad \text{[Equation 9]}$$

Where $\overline{A^{(l)}}=A+\beta^{(l)}I_{|\mathcal{V}|}$ is a self-weighted adjacency matrix, and $\beta^{(l)}$ is a trainable parameter. $\overline{D}\in R^{|\mathcal{V}|\times|\mathcal{V}|}$ is a diagonal matrix formulated as follows.

$$\overline{D_{(w,h),(w,h)}} = 1 + \sum_{w'=1,h'=1}^{W,H} A_{[(w,h),(w',h')]} \qquad \text{[Equation 10]}$$

In a shared weighted graph propagation neural network (SGP), the trainable function $$\mathcal{K}_i^{(l)}(\cdot)$$

is defined as follows.

$$\mathcal{K}_i^{(l)}(\cdot) = \sigma\backslash\mathrm{big}\left(BN_i^{(l)}\left(\cdot W_i^{(l)}\right)\right) \qquad \text{[Equation 11]}$$

Where $c^{(l)}$, $$W_1^{(l)} \in R^{c^{(l)} \times c^{(l)}}, \; W_2^{(l)} \in R^{c^{(l)} \times c^{(l+1)}},$$

$BN_i$, and $\sigma$ are the median dimension size, first and second propagation parameters, batch normalization and ReLU nonlinearity, respectively.

The GCN may be utilized to construct a deeper model.

Given a diagonal matrix D which is $D_{ii} = \Sigma_j A_{ij}$, when a linear approximation of the Chebyshev polynomial of the spectral graph resolution is applied to the method according to an embodiment, the self-weighted message-passing neural network (SMP) will be formulated as $$\widehat{\boldsymbol{v}(l)} = \left(I_{|v|} + D^{-\frac{1}{2}} A D^{-\frac{1}{2}}\right) V^{(l)}.$$

However, the eigenvalues of $$I_{|v|} + D^{-\frac{1}{2}} A D^{-\frac{1}{2}}$$

is in the range [0, 2], so multiple stacks of these layers to construct the deeper model may cause explosion or extinction gradient problems. The GCN addressed the problem directly and implemented normalization of operations by substituting $$\widetilde{D}^{-\frac{1}{2}} \widetilde{A} \widetilde{D}^{-\frac{1}{2}} \text{ for } I_{|v|} + D^{-\frac{1}{2}} A D^{-\frac{1}{2}}.$$

In this case, the network is allowed to more reliably backpropagate within a deeper network. In addition, the general covariance shift is reduced in deep models by adding batch normalization. Details of the approximation derivation of spectral graph convolution and the following discussion may be found in non-patent document 4.

SO(2)-Equivariance Property of SWN-GCN

Below, it is shown that the structure of SWN-GCN yields a rotation equivariant representation by the structural properties. Basically, the representation of a rotated image must be strictly defined.

Definition 1. Given (u', v') and $T^\theta \in SO(2)$ which satisfy $$T^\theta \left[w - \frac{W}{2}, h - \frac{H}{2}\right]^T = \left[u' - \frac{W}{2}, v' - \frac{H}{2}\right]^T,$$

all pixel values of the rotated image $$\mathcal{R}_{(u,v)}^\theta$$

are defined as follows.

$$\mathcal{R}_{(u,v)}^\theta := h(\mathcal{X}_{(w,h)}; (u', v')) \qquad \text{[Equation 12]}$$

Where h(:,(u', v')) is an interpolation function that assigns an interpolation value to the pixel closest to (u, v) of $\mathcal{R}^\theta$. It may be said that $$\mathcal{R}_{(u,v)}^\theta$$

and $\mathcal{X}_{(w,h)}$ form a spatial correspondence.

Then, by indicating that all vertices of the vertical image and the spatially corresponding vertices of the rotated image are the same throughout the propagation, the rotation equivariance of the first propagation vertex set $V^{(l)}$ may be directly represented.

Proposition 1. Let 'H' be the set of vertices of the rotated image $\mathcal{R}^\theta$. Then the following approximation is maintained for all $w \in \{1 \ldots W\}$, $h \in \{1 \ldots H\}$ and $l \in \{0 \ldots L_f\}$.

$$\mathcal{H}_{(u,v)}^{(l)} \approx \mathcal{V}_{(w,h)}^{(l)} \qquad \text{[Equation 13]}$$

Proof. Induction is used to prove the proposition.

(a) When l=0 or when all vertex representations are original pixel values, it may be assumed as follows.

Assumption 1. For all $w \in \{1 \ldots W\}$, $h \in \{1 \ldots H\}$, $$\mathcal{H}_{(u,v)}^{(0)} \approx \mathcal{V}_{(w,h)}^{(0)}.$$

Considering that interpolation does not significantly change the values of most pixels, the assumption is reasonable in the definition of the present embodiment for the spatial correspondence of Equation 12.

(b) Then, assuming that Equation 13 is maintained when l=n, the embodiments need to show that the equation is maintained when l=n+1.

$$\xi^{(n)}\left(\zeta^{(n)}\left(\mathcal{V}^{(n)}\right)\right)_{(w,h)} = \xi^{(n)}\left(\zeta^{(n)}\left(\mathcal{H}^{(n)}\right)\right)_{(u,v)} \qquad \text{[Equation 14]}$$

First, SMP preserves the rotation invariance or $\zeta^{(n)}(\mathcal{V}^{(n)})_{(w,h)} = \zeta^{(n)}(\mathcal{H}^{(n)})_{(u,v)}$ of the spatial correspondence. According to Equation 7, because there are 9 vertices including themselves that calculate non-zero adjacency for each vertex according to Equation 7 (assuming that the image is rotated with zero padding), the degree matrix D of Equation 10 is approximated to $9I_{|V|}$.

Therefore, the degree matrix may be approximated by scalar multiplication of the identity matrix, and Equation 8 may be rearranged as follows.

$$\overline{D}^{-\frac{1}{2}}\overline{A}^{(l)}\overline{D}^{-\frac{1}{2}} = \overline{D}^{-1}\overline{A}^{(l)} \qquad \text{[Equation 15]}$$

Then, Equation 15 may be utilized to express $$\overline{\nu_{(w,h)}^{(n)}} = \zeta^{(n)}\big(\mathcal{V}^{(n)}\big)_{(w,h)}$$

as follows.

$$\overline{\nu_{(w,h)}^{(n)}} = 1/9\Big(\beta^{(n)}\mathcal{V}_{(w,h)}^{(n)} + {\textstyle\sum_{i=w-1,j=h-1,i\neq w,j\neq h}^{w+1,h+1}} \mathcal{V}_{(i,j)}^{(n)}\Big) \qquad \text{[Equation 16]}$$

As such, $$\overline{\mathcal{H}_{(u,v)}^{(n)}} = \zeta^{(n)}\big(\mathcal{H}^{(n)}\big)_{(u,v)}$$

may also be expressed by the same process used to obtain Equation 16.

$$\overline{\mathcal{H}_{(u,v)}^{(n)}} = 1/9\Big(\beta^{(n)}\mathcal{H}_{(w,h)}^{(n)} + {\textstyle\sum_{i=w-1,j=h-1,i\neq w,j\neq h}^{w+1,h+1}} \mathcal{H}_{(i,j)}^{(n)}\Big) \qquad \text{[Equation 17]}$$

In fact, in Equation 16 and Equation 17, the sums of adjacent vertices of $$\mathcal{V}_{(w,h)}^{(n)} \text{ and } \mathcal{H}_{(u,v)}^{(n)}$$

are the same. Specifically, there is local rotational consistency as the following assumption.

Assumption 2. (Local rotational consistency)

$$E\Big[{\textstyle\sum_{i=w-1,j=h-1,i\neq w,j\neq h}^{w+1,h+1}} \mathcal{V}_{(i,j)}^{(n)}\Big] = E\Big[{\textstyle\sum_{i=u-1,j=v-1,i\neq u,j\neq v}^{u+1,v+1}} \mathcal{H}_{(i,j)}^{(n)}\Big] \qquad \text{[Equation 18]}$$

A fixed rotation of an image does not change the list of adjacent vertices. That is, the sum is kept constant during fixed rotation. However, the values of the retrieved vertices in the rotated image that are not multiples of 90° may be slightly different due to interpolation. However, it is reasonable to assume that the sum of adjacent vertices with values slightly deviating from each interpolation is acceptably constant. According to the experimental result, this assumption is sufficiently reasonable to derive the most invariant representation among all criteria. Meanwhile, we may conclude $\zeta^{(n)}(\mathcal{V}^{(n)})_{(w,h)} \approx \zeta^{(n)}(\mathcal{H}^{(n)})_{(u,v)}$ from the given $$\beta^{(n)}\mathcal{V}_{(w,h)}^{(n)} \approx \beta^{(n)}\mathcal{H}_{(u,v)}^{(n)}$$

from the inductive assumption.

Then, the value multiplied by the weight is shared and $$\xi^{(n)}(\overline{\mathcal{V}^{(n)}})_{(w,h)} \approx \xi^{(n)}(\overline{\mathcal{H}^{(n)}})_{(u,v)}$$

is easily maintained because ReLU is not a one-to-many function. Meanwhile, batch normalization preserves approximate equivalence acceptably, but not strictly. Thus, it is possible to conclude $$\mathcal{V}_{(w,h)}^{(n+1)} \approx \mathcal{H}_{(u,v)}^{(n+1)}$$

for a given $$\mathcal{V}_{(w,h)}^{(n)} \approx \mathcal{H}_{(u,v)}^{(n)}$$

and complete the inductive proof.

Global Average Pooling for Mapping and Classification of Invariant Representation A recent graph-based network, (non-patent document 1) maps an equivariant vertex to an invariant representation by using a statistical layer that calculates the mean and variance of a graph signal using a graph Chebyshev polynomial of order $K_{max}$. Given a set of vertices after the $L_f$-th propagation, in which all vertices are denoted as $R^{c^{(L_f)}}$, the statistical layer calculates the number of $c^{(L_f)}(K_{max}+1)$ of the mean and variance. However, such a process may be burdensome for an equivariant representation expressed in a high representation space searched for in a deep network according to an embodiment in which the dimension of the representation space may go up to $c^{(L_f)}=512$.

Meanwhile, the deep network has demonstrated that the global permutation invariant operation, such as a maximum or average operation, may efficiently aggregate high-dimensional representations. To this end, using GAP, a rotation equivariant vertex set $V^{(L_f)}$ is aggregated into an invariant representation $z \in R^{c \times (L_f)}$ as follows.

$$z = \frac{1}{W \cdot H} {\textstyle\sum_{w=1,h=1}^{W,H}} \mathcal{V}_{(w,h)}^{(\mathcal{L}_h)} \qquad \text{[Equation 19]}$$

Because the sum is a permutation-invariant operation, GAP produces a rotation invariance $z$ at the rotation equivariant vertex $V^{(L_f)}$. In this case, the permutation occurs in the set of rotation equivariant vertices. Unlike the direct use of GAP, which requires the last feature representation dimension equal to the number of classification classes, the equivariant space according to the embodiment is mapped to a much higher dimension before GAP and the final classification is is performed by the fully connected layer nonlinearized with ReLU. A summary of the method may be found in algorithm 1 of Table 1.

TABLE 1

| Algorithm 1: SWN-GCN for SO(2)-invariant representation of an image |
| --- |
| given $\mathcal{X}$ (input image), L (Layer configurations)<br>$\;\;\;\mathcal{G} = (\mathcal{V}, A) \leftarrow$ Image2Graph($\mathcal{X}$) (Eq. 6, Eq. 7)<br>$\;\;\;$for l in L do<br>$\;\;\;\;\;\;\widehat{\mathcal{V}} \leftarrow \zeta^{(l)}(\mathcal{V}, A)$ (Eq. 8)<br>$\;\;\;\;\;\;\;\;\; V \leftarrow \xi^{(l)}(\widehat{\mathcal{V}})$ (Eq. 9)<br>$\;\;\;$end for<br>$\;\;\;\;\;\; z \leftarrow$ GAP($\mathcal{V}$)<br>$\;\;\;$return linear_classifier(z) (Eq. 19) |

As described above, the embodiments propose an artificial intelligence network that extracts equivariant and invariant representations in the rotation of an image.

In the existing artificial intelligence learning, a data augmentation scheme is used to perform robust learning on image rotation, but this has the following problems. In the data augmentation scheme, the learning data increases exponentially in proportion to the number of augmentation algorithms. In addition, it is very inefficient to prepare learning data by augmenting all variables in order to consider all variables that may frequently occur in real life for application of technology.

According to the present embodiments, it is possible to acquire rotation equivariant and invariant representation of an image by utilizing the structural characteristics of a graph convolutional network without data augmentation. Accordingly, it is possible to obtain a constant representation of the rotation of the image without data augmentation.

The embodiments are universally applicable to cases for artificial intelligence learning of images including arbitrarily rotated objects. For example, the embodiments are applicable to medical images, aerial and drone images, images for biological research, and the like. In addition, the embodiments may be used in applications that need to understand and utilize an arbitrarily rotated object as artificial intelligence. For example, the embodiments may be used for place similarity evaluation, face recognition, and the like.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

According to embodiments, it is possible to provide a method and apparatus for learning an equivariant and invariant representation for rotation of an image based on a graph convolutional network, which are capable of acquiring a constant representation of the rotation of an image without data augmentation by acquiring the rotation equivariant and invariant representation of the image by using the structural characteristics of the graph convolutional network.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Thus, it is intended that the inventive concept covers other realizations and other embodiments of this invention provided they come within the scope of the appended claims and their equivalents.

What is claimed is:

1. A method of learning an equivariant and invariant representation for rotation of an image based on a graph convolutional network performed by a computer device, the method comprising:

learning the equivariant representation for rotation of the image by using a self-weighted nearest neighbors graph convolutional network (SWN-GCN); and finally obtaining the equivariant representation for the rotation of the image obtained from the self-weighted nearest neighbors graph convolutional network as the invariant representation of the rotation of the image by using permutation invariance of global average pooling (GAP).

2. The method of claim 1, wherein the self-weighted nearest neighbors graph convolutional network (SWN-GCN) learns the equivariant representation of the rotation of the image based on a scheme of applying the graph convolutional network to a graphed image.

3. The method of claim 1, wherein the learning of the equivariant representation includes:

representing an image as a graph having a vertex by using the self-weighted nearest neighbors graph convolutional network (SWN-GCN);

obtaining an adjacency matrix representing adjacency between two vertices; and constructing a unit layer of an equivariant network by using unit propagation of the self-weighted nearest neighbors graph convolutional network (SWN-GCN) when a propagation set of the vertex is given.

4. The method of claim 3, wherein the unit propagation of the self-weighted nearest neighbors graph convolutional network (SWN-GCN) includes a self-weighted message passing network (SMP) and a shared-weight graph propagation network (SGP).

5. The method of claim 1, wherein the final obtaining of the equivariant representation includes:
   representing a set of equivariant vertices for rotation of the image in an invariant representation by using the global average pooling (GAP).

6. The method of claim 1, wherein the final obtaining of the equivariant representation includes:
   performing final classification with a fully connected layer non-linearized with ReLU.

7. The method of claim 1, wherein the equivariant and invariant representation for the rotation of the image is obtained by utilizing a structural feature of the self-weighted nearest neighbors graph convolutional network (SWN-GCN) without data augmentation.

8. An apparatus for learning an equivariant and invariant representation for rotation of an image based on a graph convolutional network, the apparatus comprising:
   a rotation equipvarient representation unit configured to learn the equivariant representation for the rotation of the image by using a self-weighted nearest neighbors graph convolutional network (SWN-GCN); and
   a rotation invariant representation unit configured to finally obtain the equivariant representation for the rotation of the image obtained from the self-weighted nearest neighbors graph convolutional network as the invariant representation of the rotation of the image by using permutation invariance of global average pooling (GAP).

9. The apparatus of claim 8, wherein the self-weighted nearest neighbors graph convolutional network (SWN-GCN) learns the equivariant representation of the rotation of the image based on a scheme of applying the graph convolutional network to a graphed image.

10. The apparatus of claim 8, wherein the rotation equipvarient representation unit is configured to
   represent an image as a graph having a vertex by using the self-weighted nearest neighbors graph convolutional network (SWN-GCN), obtain an adjacency matrix representing adjacency between two vertices, and construct a unit layer of an equivariant network by using unit propagation of the self-weighted nearest neighbors graph convolutional network (SWN-GCN) when a propagation set of the vertex is given.

11. The apparatus of claim 10, wherein the unit propagation of the self-weighted nearest neighbors graph convolutional network (SWN-GCN) includes a self-weighted message passing network (SMP) and a shared-weight graph propagation network (SGP).

12. The apparatus of claim 8, wherein the rotation invariant representation unit is configured to:
   represent a set of equivariant vertices for the rotation of the image in the invariant representation by using the global average pooling (GAP).

13. The apparatus of claim 8, wherein the rotation invariant representation unit is configured to:
   perform final classification with a fully connected layer non-linearized with ReLU.

14. The apparatus of claim 8, wherein the equivariant and invariant representation for the rotation of the image is obtained by utilizing a structural feature of the self-weighted nearest neighbors graph convolutional network (SWN-GCN) without data augmentation.

* * * * *